(12) United States Patent
Gmirya

(10) Patent No.: US 7,413,142 B2
(45) Date of Patent: Aug. 19, 2008

(54) SPLIT TORQUE GEARBOX FOR ROTARY WING AIRCRAFT WITH TRANSLATIONAL THRUST SYSTEM

(75) Inventor: Yuriy Gmirya, Woodbridge, CT (US)

(73) Assignee: Sikorsky Aircraft Corporation, Stratford, CT (US)

(*) Notice: Subject to any disclaimer, the term of this patent is extended or adjusted under 35 U.S.C. 154(b) by 417 days.

(21) Appl. No.: 11/140,762

(22) Filed: May 31, 2005

(65) Prior Publication Data
US 2006/0266883 A1    Nov. 30, 2006

(51) Int. Cl.
*F16H 35/18* (2006.01)
*B64D 35/06* (2006.01)
(52) U.S. Cl. ............. 244/60; 244/17.23; 74/665 P
(58) Field of Classification Search ............ 244/17.19, 244/17.21, 17.23, 60; 74/665 C, 665 D, 665 P
See application file for complete search history.

(56) References Cited

U.S. PATENT DOCUMENTS

| 2,487,020 A | * | 11/1949 | Gilcrease | 416/127 |
| 3,357,656 A | * | 12/1967 | Peterson | 244/17.23 |
| 4,489,625 A | * | 12/1984 | White | 74/665 C |
| 4,531,692 A | * | 7/1985 | Mateus | 244/17.19 |
| 5,271,295 A | * | 12/1993 | Marnot | 74/665 B |

* cited by examiner

*Primary Examiner*—Rob Swiatek
(74) *Attorney, Agent, or Firm*—Carlson, Gaskey & Olds

(57) ABSTRACT

A gearbox of a high speed compound rotary-wing aircraft includes a main module, an input module and a translational thrust module. The input module receives power from the engines to drive a dual, contra-rotating, coaxial main rotor system and a translational thrust system which provides significant translational thrust generally parallel to an aircraft longitudinal axis. Each of a multiple of engine drives the input module such that power is distributed to the main module and the translational thrust module. The gearbox provides a lightweight solution, since each module need only transmit a required fraction of available engines power.

20 Claims, 7 Drawing Sheets

SPLIT TORQUE GEARBOX FOR ROTARY WING AIRCRAFT WITH TRANSLATIONAL THRUST SYSTEM

BACKGROUND OF THE INVENTION

The present invention relates to a split torque gearbox, and more particularly to a main gearbox for a rotary wing aircraft which directs significant power to a tail mounted pusher prop system.

A gearbox system of a rotary wing aircraft transfers power from a turbine engine to the rotor system. A typical system may direct power from several turbine engines to a single rotor system which may include a multiple of blades. Since the rotational velocity of the rotor is significantly lower than the rotational velocity of the turbine engines, the turbine engine rotational velocity must be reduced by the gearbox system. In reducing the rotational velocity of the turbine engine output, torque is increased through a series of intermediate gear stages and shafts, before the final output drive is provided to the rotor.

Conventional rotary-wing aircraft have a forward airspeed limited by a number of factors. Among these is the tendency of the retreating blade to stall at high forward airspeeds. As the forward airspeed increases, the airflow velocity across the retreating blade slows such that the blade may approach a stall condition. In contrast, the airflow velocity across the advancing blade increases with increasing forward speed.

Recent designs have pursued high speed compound aircraft in which a secondary translational propulsion system provides translational thrust while the main rotor system is operated in a reverse airflow condition during a high speed flight profile. Although such concepts have proven effective, the main planetary gearboxes for such aircraft are quite complicated and have heretofore resulted in gearbox systems which may be relatively heavy in weight and of significant packaging volume. As the rotor system locates the gearbox in an airframe center section, such a weighty and voluminous gearbox system often extends into the aircraft cabin section which may reduce aircraft payload and cabin space to an impractical capacity.

Accordingly, it is desirable to provide a lightweight, low profile gearbox system for a high speed compound rotary-wing aircraft that is readily mountable to an airframe above an aircraft cabin so as to increase payload and cabin space.

SUMMARY OF THE INVENTION

A gearbox for a high speed compound rotary-wing aircraft according to the present invention drives a dual, contra-rotating, coaxial rotor system and a translational thrust system to provide significant translational thrust generally parallel to an aircraft longitudinal axis.

The gearbox preferably includes a main module, an input module and a translational thrust module. The input module receives power from one or more engines to drive the contra-rotating rotor shafts and the translational thrust module, which, in turn, drives the translational thrust system.

The input module preferably distributes power to the main module and to the translational thrust module. The gearbox provides a lightweight solution, since each module is designed to transmit only a required fraction of the available engine power.

The main module preferably includes a first rotor shaft and a second rotor shaft driven by first and second spur gears for coaxial counter-rotation of the rotor system about a rotor axis of rotation. The first and second spur gear/main gear interface in an internal/external gear engagement manner such that a common spur gear shaft is inherently constrained to minimize vibrations thereof while incorporating a multitude of gear train paths with symmetrically located contra-rotating output gears. Such configuration reduces the number and size of gears and associated bearings, which decreases system weight while facilitating packaging within a low-profile housing which is shaped for attachment to the airframe above the aircraft cabin.

The translational thrust module includes a main translational thrust gear which is preferably loaded from at least two sides by engine #1 and engine #2. Thus, the main translational thrust gear is constrained in a manner which minimizes vibrations and reduces bearing size to further decrease system weight. A transmission shaft from the main translational thrust gear drives a spur gear located as a sun gear between a multitude of planet idler gears. A spur gear with inwardly facing gear teeth revolves around the multitude of planet idler gears to drive the translational thrust system. The translational thrust module thereby drives the translational thrust system with a compact gearbox of reduced cross-sectional area.

The present invention therefore provides a lightweight, low profile gearbox system for a high speed compound rotary-wing aircraft that is readily mountable to an airframe above an aircraft cabin so as to increase payload and cabin space.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
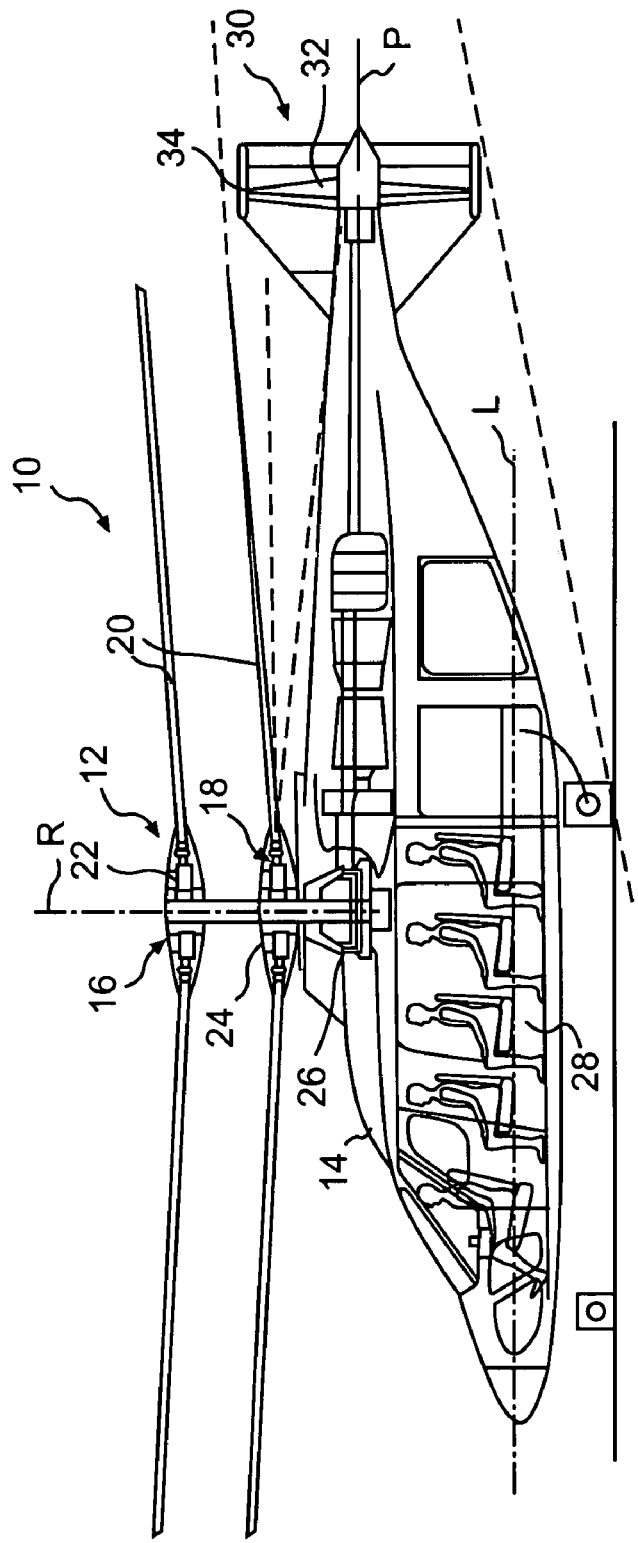
FIGS. 1A-1B is a general schematic view of an exemplary rotary wing aircraft embodiment for use with the a split torque gearbox system present invention.
Figure 1B:
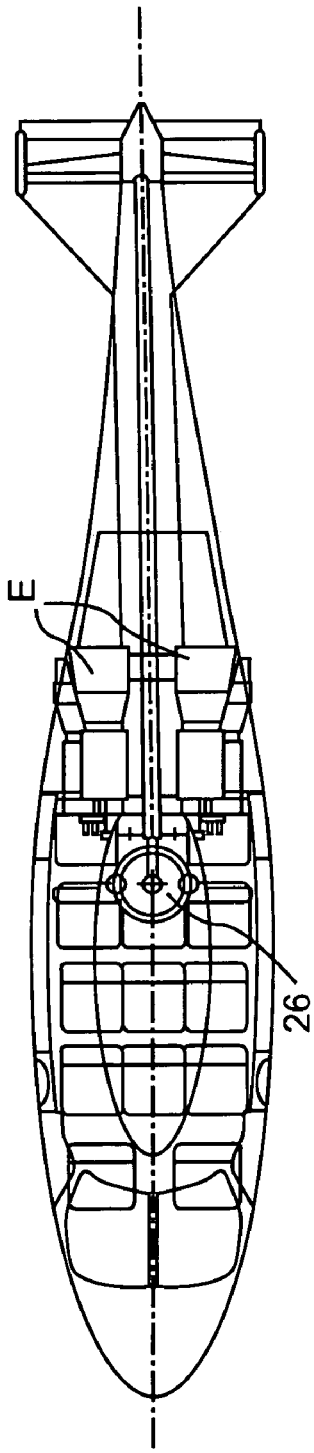

FIGS. 1A-1B illustrate a vertical takeoff and landing (VTOL) high speed compound rotary-wing aircraft 10 having a dual, countra-rotating, coaxial rotor system 12. The aircraft 10 includes an airframe 14 which supports the dual, counter rotating, coaxial rotor system 12 as well as a translational thrust system 30 to provide translational thrust generally parallel to an aircraft longitudinal axis L. It should be understood that other aircraft configurations will benefit from the present invention.

The rotor system 12 includes a first rotor system 16 and a second rotor system 18 each rotor system 16, 18 includes a multiple of rotor blades 20 mounted to a rotor hub 22, 24. The rotor system 12 is powered by a main gearbox 26 which is preferably located above the aircraft cabin 28.

The translational thrust system 30 preferably includes a pusher propeller 32 having a propeller rotational axis P oriented substantially horizontal and parallel to the aircraft longitudinal axis L to provide thrust for high-speed flight. Preferably, the pusher propeller 32 is mounted within an aerodynamic cowling 34 mounted to the rear of the airframe 14. The translational thrust system 30 is driven by the same main gearbox 26 which drives the rotor system 12.

The main gearbox 26 is driven by one or more engines E (two shown). In the case of a rotary wing aircraft, the gearbox 26 is preferably interposed between one or more gas turbine engines (illustrated schematically at E), the rotor system 12 and the translational thrust system 30. The main gearbox 26 is preferably a split torque gearbox which carries torque from the engines E through a multitude of drive train paths. The multiple of paths provides a gearbox which is of significantly less weight than conventional planetary gearboxes while providing redundant transmission paths should one path be rendered inoperable. Furthermore, the gearbox 26 provides a relatively low profile structure such that packaging above the aircraft cabin 28 is readily facilitated. As shown, the engines E are preferably located rearward of the gearbox 26 to provide an efficient packaging arrangement which increases crew and/or cargo capacity by minimizing incursion of the gearbox 26 into the aircraft cabin 28 as would be common with a typical planetary gear arrangement.

Figure 2:
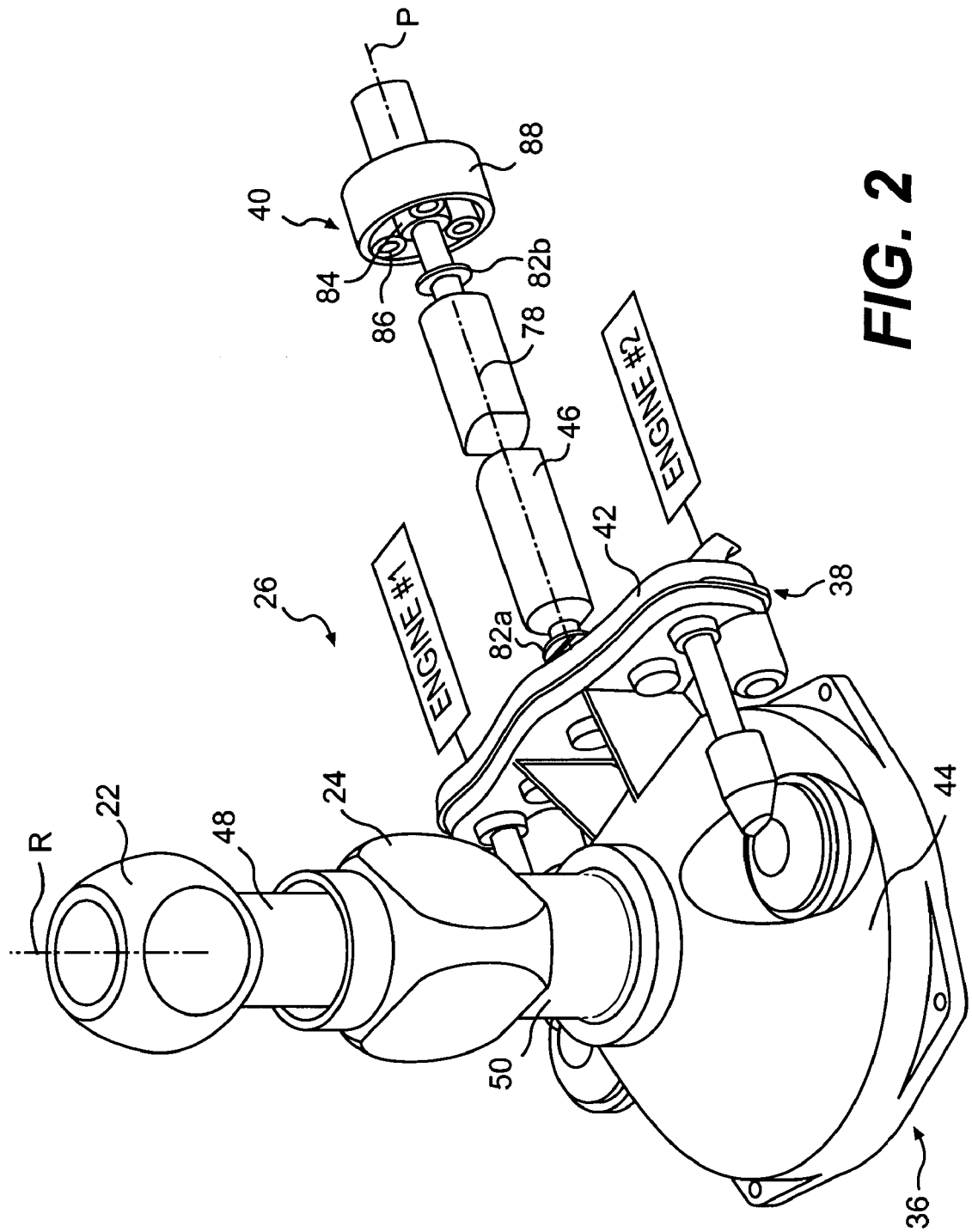
FIG. 2 is a perspective view of a split torque gearbox according to the present invention.

Referring to FIG. 2, the gearbox 26 generally includes a main module 36, an input module 38 and a translational thrust module 40. The input module 38 is preferably contained within an input housing 42 mounted directly to a main housing 44 of the main module 36. The translational thrust module 40 is spaced away from the input housing 42 but connected thereto through a transmission shaft 46.

A first rotor shaft 48 and a second rotor shaft 50 of the rotor system 12 extend from the main module 36. The first rotor hub 22 is mounted to the first rotor shaft 48, while the second rotor hub 24 is mounted to the second rotor shaft 50 for coaxial counter-rotation about a rotor axis of rotation R. In use, the input module 38 receives power from the engines E to drive the main module 36 and the translational thrust module 40. The translational thrust module 40 drives the translational thrust system 30.

Figure 3:
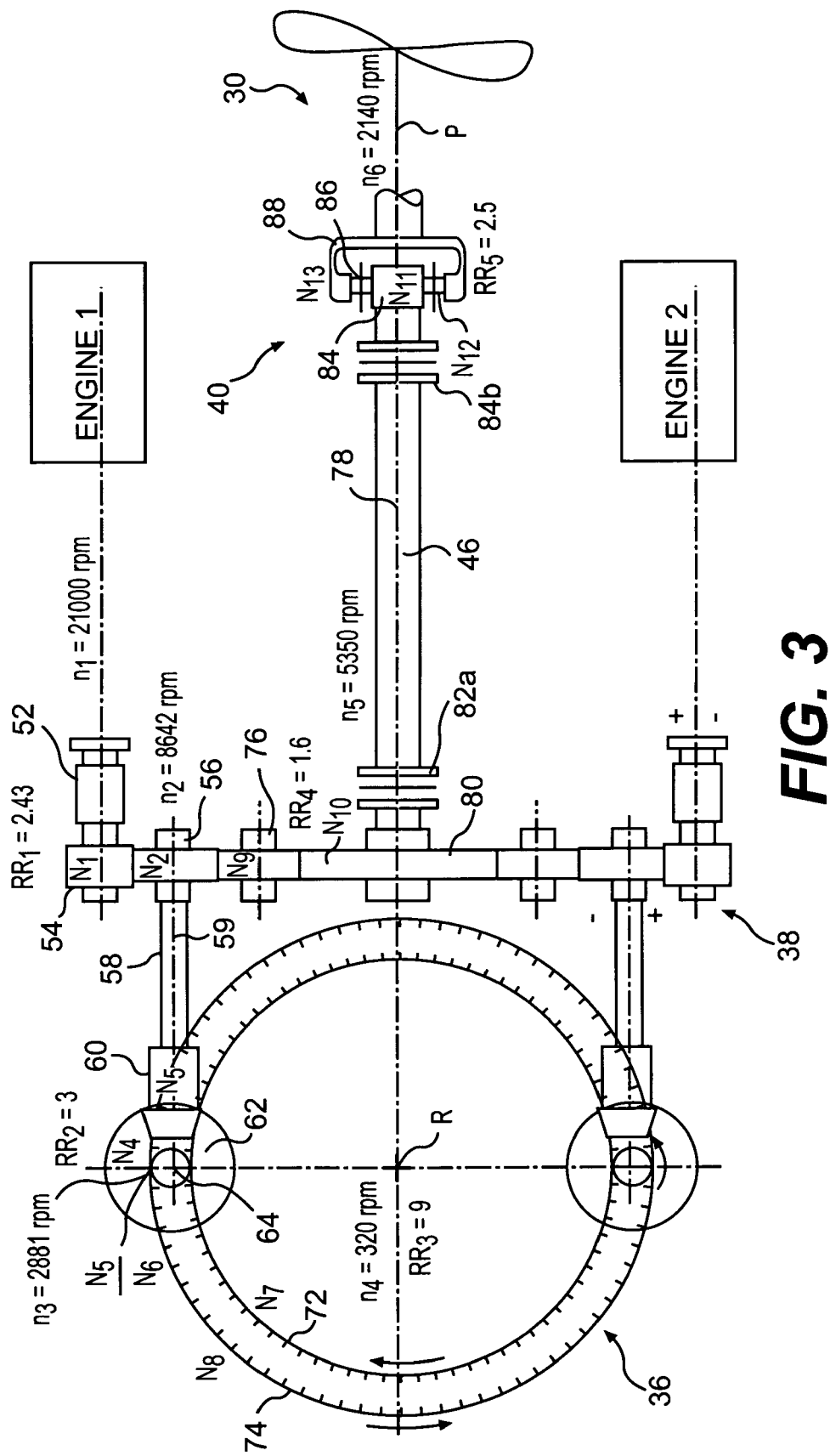
FIG. 3 is a top schematic view of a split torque gearbox according to the present invention.

Referring to FIG. 3, the gearbox 26 receives engine power through a high speed input shaft 52 driven by the engine E. Although only the gear train from engine #1 will be discussed in detail herein, the gear train from engine #2 is identical and it should be understood that any number of engines E may be utilized with the present invention. Preferably, each engine E drives the input module 38 and power is distributed to the rotor and translational thrust system therefrom. This design provides a lightweight solution, since each module transmits only a required fraction of available engine power.

Figure 4:
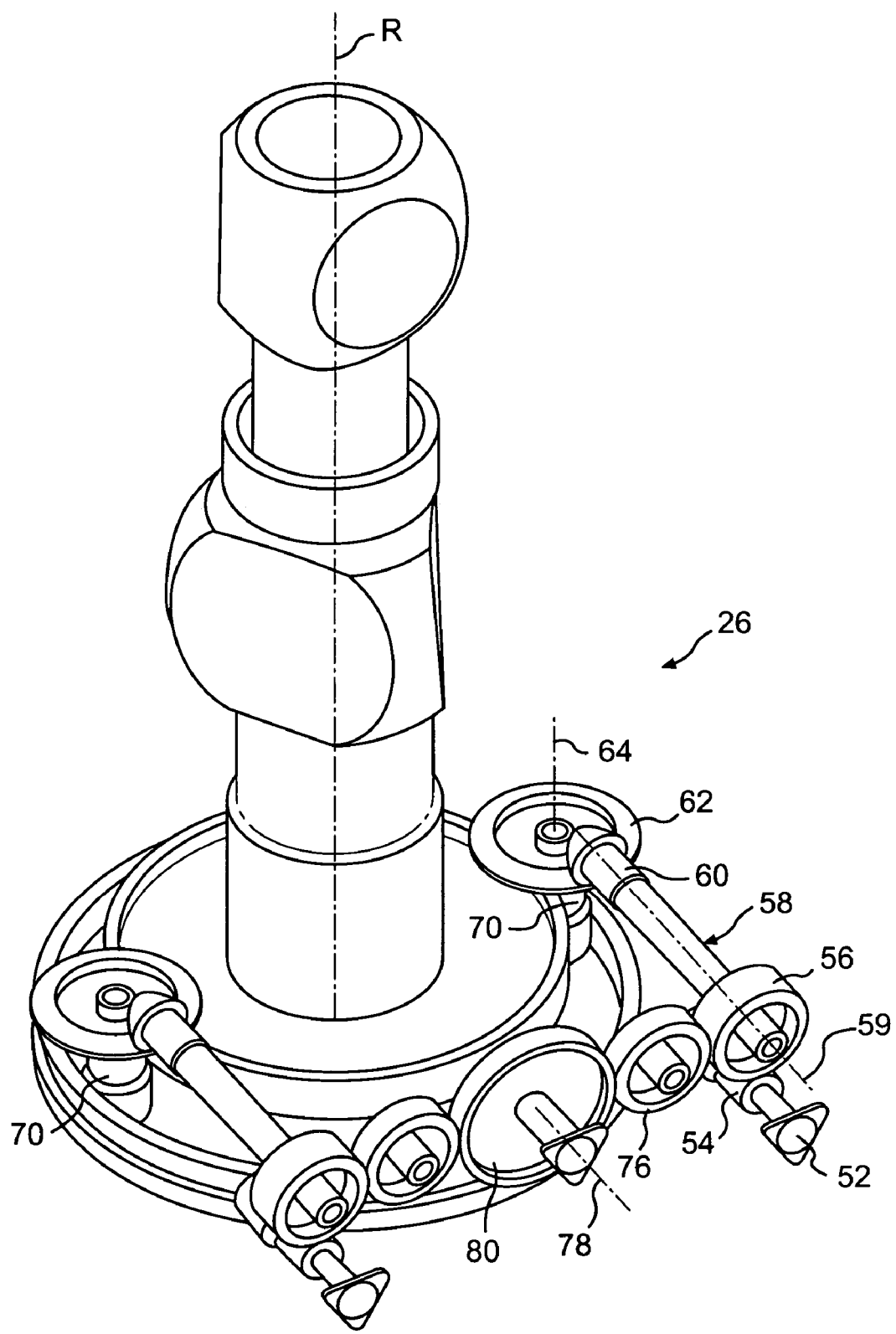
FIG. 4 is a oblique rearward perspective view of a split torque gearbox according to the present invention.

Preferably, the high speed input shaft 52 includes a helical gear N1 54 which drives a corresponding helical gear N2 56. It should be understood, that although particular gear types are discussed in the illustrated embodiment and although the preferred form is specified, gear forms other than the specific gear forms may also be utilized with the present invention. The helical gear N2 56 is located within the input module 38 to drive an input shaft 58 which rotates about an input shaft axis of rotation 59 located generally transverse to the rotor axis of rotation R (also illustrated in FIG. 4).

Preferably, the helical gear N1 54 and helical gear N2 56 form a helical gear set with a gear reduction of $RR_1=2.43$. It should be understood that the reduction is related to engine power, rotor speed and other variables such that other reductions would be desired for other operational requirements. In the illustrated embodiment, the engine power is approximately 1000 horsepower per engine.

The helical gear N2 56 provides an interface between the input module 38, the main module 36, and the translational thrust module 40. That is, the power is consumed from a single source (input module) and distributed subsequently to all other modules so that the main and translational thrust modules receive only the necessary amount of power based on operational requirements, as will be described in greater detail below.

Figure 5:
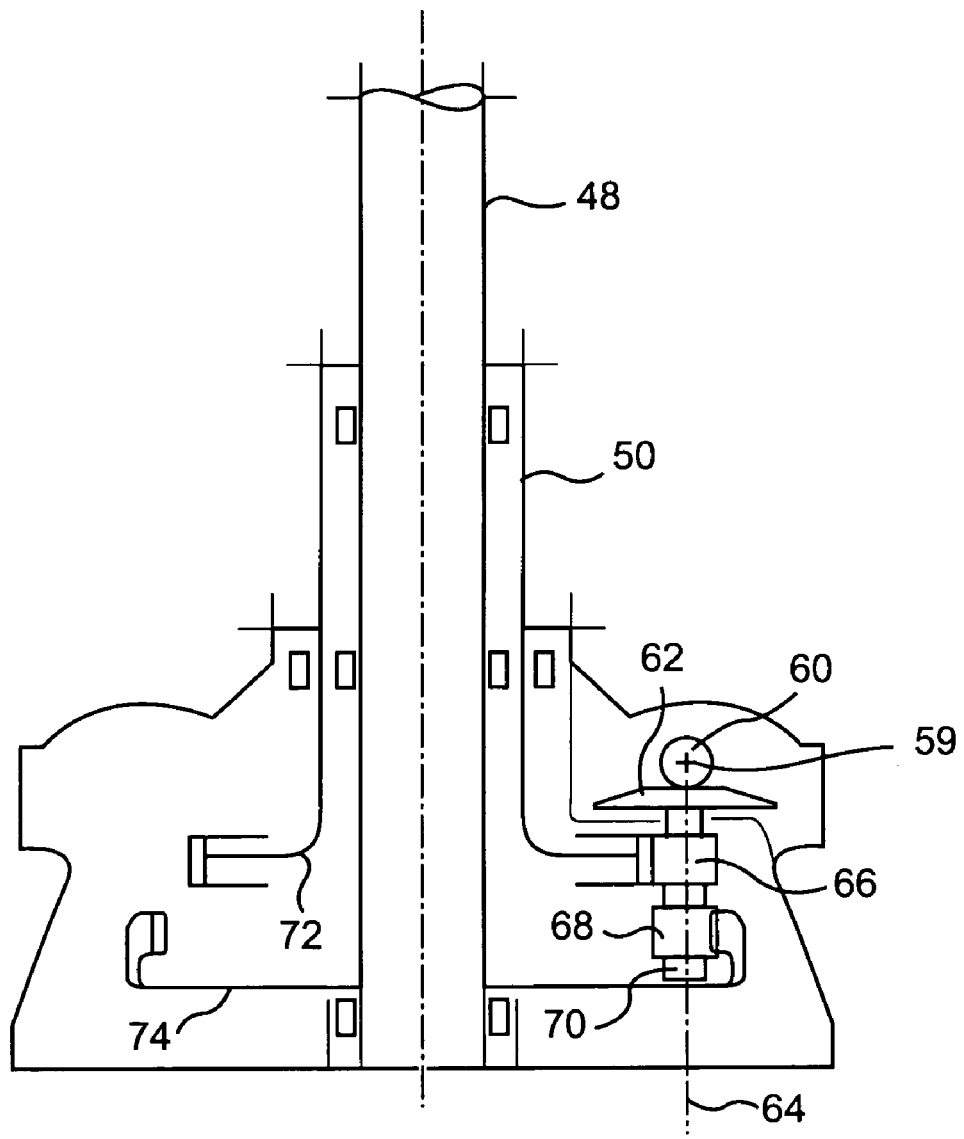
FIG. 5 is a schematic rear view of a split torque gearbox according to the present invention.
Figure 6:
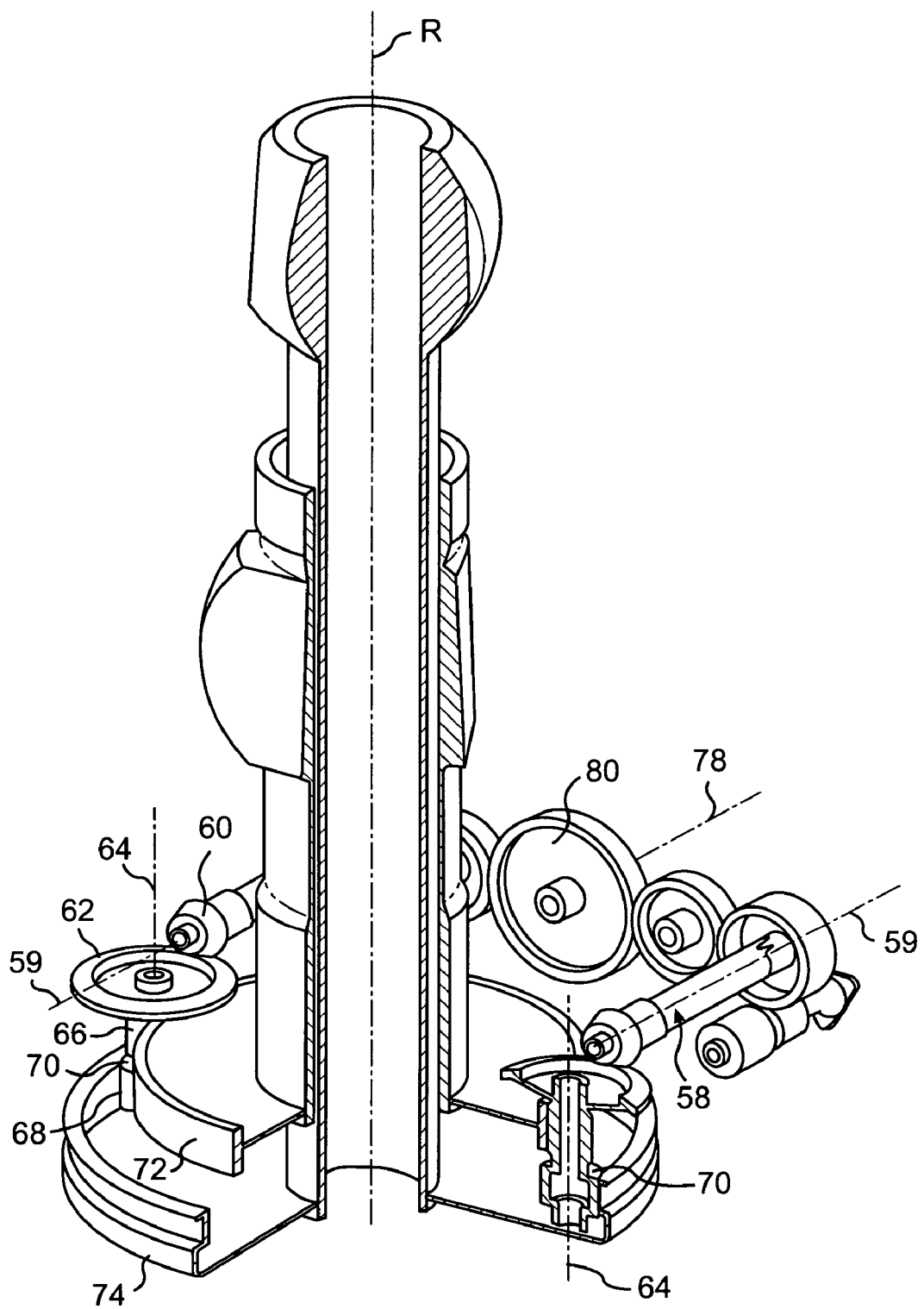
FIG. 6 is a oblique perspective front view of a split torque gearbox gear train according to the present invention.
Figure 7:
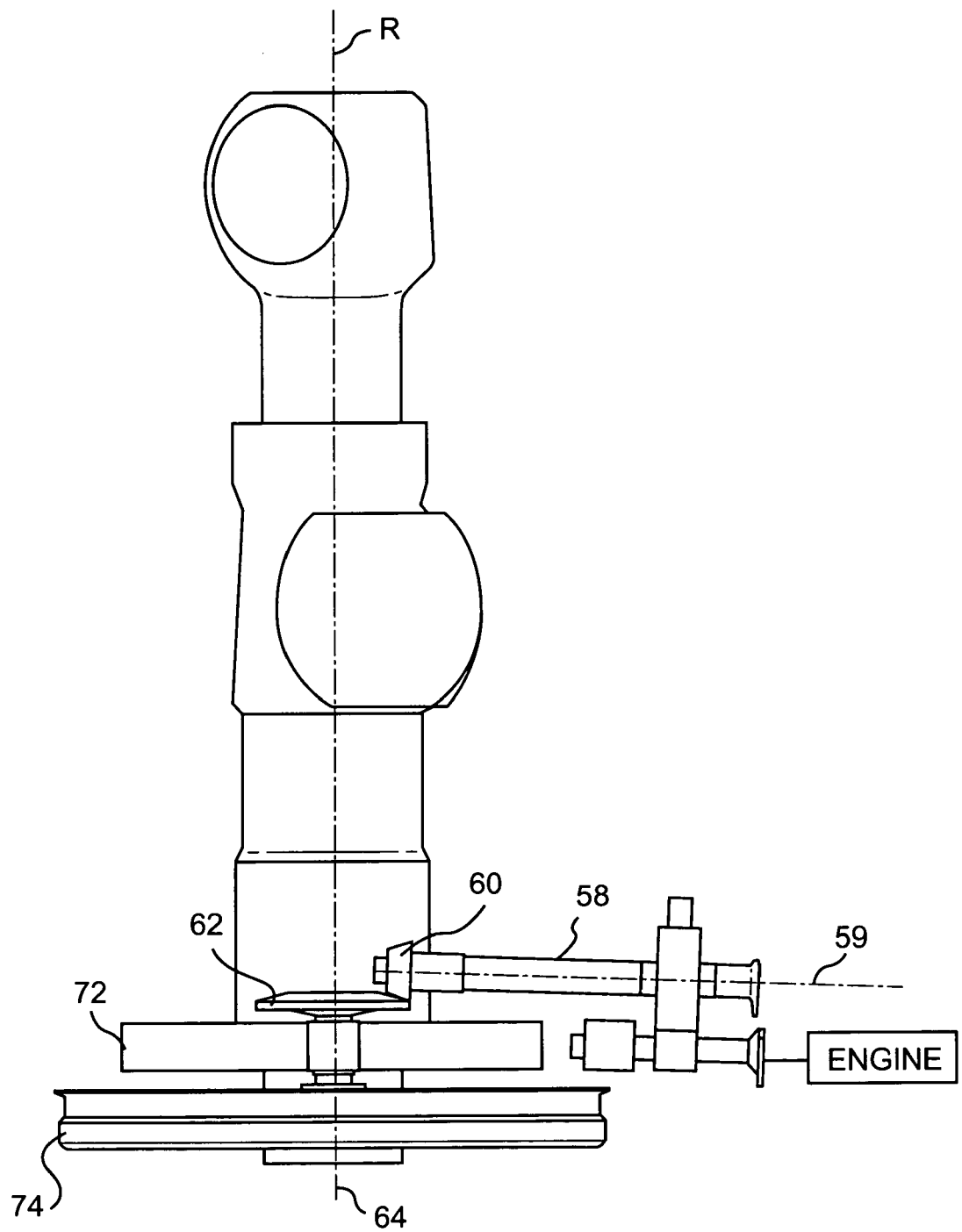
FIG. 7 is a side view of a split torque gearbox gear train according to the present invention.

From the helical gear N2 56, the input shaft 58 drives a spiral bevel gear N3 60 mounted thereto and located within the main module 36. The spiral bevel gear N3 60 drives a spiral bevel gear N4 62 about an axis of rotation 64 generally parallel to the rotor axis of rotation R (also illustrated in FIGS. 4 and 5). The spiral bevel gear N3 60 preferably engages the spiral bevel gear N4 62 to generate a gear reduction of $RR_2=3$. The spiral bevel gear N3 60 engages the spiral bevel gear N4 62 in a facial mesh arrangement which transfers torque from the input shaft axis of rotation 59 to axis of rotation 64 which is generally transverse thereto. The spiral bevel gear N4 62 drives a spur gear N5 66 and a spur gear N6 68 about the axis of rotation 64. The spur gears N5 66 and N6 68 are preferably mounted to a common spur gear shaft 70 such that spiral bevel gear N4 62, spur gear N5 66 and spur gear N6 68 rotate as a unit about axis of rotation 64, which is parallel to rotor axis of rotation R.

The spur gear N5 66 meshingly engages main spur gear N7 72 which drives the second rotor shaft 50 about rotor axis of rotation R. The spur gear N6 68 meshingly engages with main spur gear N8 74 which drives the first rotor shaft 48 about the axis of rotation R. That is, the first rotor shaft 48 is mounted to main spur gear N8 74 and the second rotor shaft 50 is mounted to the main spur gear N7 72. Preferably, the spur gear N5 66 meshingly engages main spur gear N7 72 along the outer periphery of main spur gear N7 72 while the spur gear N6 68 meshingly engages with main spur gear N8 74 about an inner periphery of main spur gear N8 74 to provide counter rotation therebetween. That is, the gear teeth of main spur gear N7 72 extend outwardly relative to the rotor axis of rotation R and the gear teeth of main spur gear N8 74 extend inwardly toward the rotor axis of rotation R.

Spur gear N5 66/main spur gear N7 72 and spur gear N6 68/main spur gear N8 74 interface in an internal/external gear engagement manner such that the common spur gear shaft 70 is inherently constrained which minimizes vibrations. Bearing number and sizing requirements are thereby reduced which further decreases system weight. The spur gear N5 66/main spur gear N7 72 and spur gear N6 68/main spur gear N8 74 interface preferably generate a gear reduction of $RR_3=9$. The pitch diameter and/or reduction ratio between spur gear N5 66 and main spur gear N7 72 and between spur gear N6 68 and main spur gear N8 74 are determined to compensate for the different main spur gear diameters to assure that the rotor shafts 48, 50 rotate at a constant speed.

The main module 36 thereby provides a low profile gearbox, with multiple gear train paths, utilizing a minimal number of symmetrically loaded output gears which contra-rotate and may be enclosed in a low-profile housing shaped for ready attachment above an aircraft cabin so as to transmit flight loads to the airframe.

With regard to the translational thrust module 40, the helical gear N2 56 drives helical gear N9 76 which is essentially an idler gear between helical gear N2 56 and the main translational helical gear N10 80. Helical gear N9 76 drives main translational helical gear N10 80 about a transmission shaft axis of rotation 78. The translational helical gear N10 80 is mounted to the transmission shaft 46 through a flex coupling 82*a* (illustrated schematically). The axis of rotation 78 is generally parallel to the input shaft axis of rotation 59 and the transmission shaft axis of rotation D. The helical gear N9 76 drives main translational helical gear N10 80 at an interface which preferably generates a gear reduction of $RR_4=1.6$. As the main translational helical gear N10 80 is loaded from at least two sides due to engines #1 and engine #2, the main translational helical gear N10 80 is constrained in a manner which minimizes vibrations and reduces bearing size to further decrease system weight.

The transmission shaft 46 drives a spur gear N11 84 through a flex coupling 82*b* (illustrated schematically). The flex couplings 82*a*, 82*b* accommodate flexing of the aircraft airframe and deflection between the translational thrust system 30 and the gearbox 26. The spur gear N11 84 is preferably a sun gear located between a multitude of planet idler gears N12 86 (three shown) which are fixed in space to reduce the gearbox cross-section (also illustrated in FIG. 2). A spur gear N13 88 with inwardly facing gear teeth revolves around the multitude of planet idler gears N12 86 to drive the translational thrust system 30 about translational thrust axis of rotation P (also illustrated in FIG. 2). The spur gear N13 88 and multitude of planet idler gears N12 86 interface preferably generate a gear reduction of $RR_5=2.5$. It should be understood that although axes 78 and P are generally in-line, and parallel to the aircraft longitudinal axis L, other arrangements as well as flexible couplings may locate the axes off-line, yet still provide direct transmission to the pusher propeller 32 (FIG. 1)

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A split torque gearbox system comprising:
   an input module;
   a main module in meshing engagement with said input module, said main module including a first main gear and a second main gear for coaxial counter rotation about a rotor axis of rotation; and
   a translational thrust module in meshing engagement with said input module, said translational thrust module including a main translational gear which rotates about a transmission shaft axis of rotation generally transverse to said rotor axis of rotation.

2. The split torque gearbox system as recited in claim 1, wherein said first main gear mounts a first rotor shaft of a first rotor system and said second main gear rotates a second rotor shaft of a second rotor system.

3. The split torque gearbox system as recited in claim 2, wherein said first rotor shaft is mounted at least partially within said second rotor shaft.

4. The split torque gearbox system as recited in claim 1, further comprising a first spur gear and a second spur gear mounted to a common spur gear shaft, said first spur gear meshingly engaged with said first main gear along an outer periphery thereof relative said rotor axis of rotation and said second spur gear meshingly engages with said first main gear about an inner periphery thereof relative to said rotor axis of rotation to provide contra-rotation between said first main gear and said second main gear.

5. The split torque gearbox system as recited in claim 4, wherein said common spur gear shaft rotates about an axis of rotation having a component generally parallel to said rotor axis of rotation.

6. The split torque gearbox system as recited in claim 5, further comprising a spiral bevel gear mounted to said common spur gear shaft, said spiral bevel gear driven by an input shaft which extends from said input module.

7. The split torque gearbox system as recited in claim 6, wherein said input shaft rotates about an input axis of rotation generally transverse to said rotor axis of rotation.

8. The split torque gearbox system as recited in claim 6, further comprising a gear which drives said input shaft, said input shaft gear in meshing engagement with said main translational gear through an intermediary gear.

9. The split torque gearbox system as recited in claim 1, wherein said main translational gear drives a transmission shaft which drives a sun gear in meshing engagement with a multitude of planet idler gears.

10. The split torque gearbox system as recited in claim 9, further comprising a spur gear with inwardly facing gear teeth revolves around said multitude of planet idler gears.

11. The split torque gearbox system as recited in claim 10, wherein said spur gear with inwardly facing gear teeth drive a translational propulsion system about a translational propulsion system axis.

12. The split torque gearbox system as recited in claim 11, wherein said translational propulsion system includes a pusher propeller.

13. The split torque gearbox system as recited in claim 11, wherein said translational propulsion system includes a ducted fan.

14. A split torque gearbox system for a high speed compound rotary-wing aircraft comprising:
   an input module having a first spur gear meshingly engaged with a second spur gear, said second spur gear meshingly engaged with a third spur gear, said first spur gear rotationally mounted about a first axis of rotation, a second spur gear mounted about a second axis of rotation, and said third spur gear mounted about a third axis of rotation, said first, second and third axes of rotation being generally transverse to a rotor axis of rotation;
   a main module in meshing engagement with said input module, said main module including a first main gear and a second main gear for coaxial counter rotation about said rotor axis of rotation, said first main gear and said second main gear driven by said second spur gear; and
   a translational thrust module in meshing engagement with said input module, said translational thrust module including a main translational gear which rotates about a transmission shaft axis of rotation generally transverse said rotor axis of rotation, said main translational gear in meshing engagement with said third spur gear.

15. The split torque gearbox system as recited in claim 14, wherein said first main gear mounts a first rotor shaft of a first rotor system and said second main gear rotates a second rotor shaft of a second rotor system.

16. The split torque gearbox system as recited in claim 14, further comprising an engine which drives said first spur gear.

17. The split torque gearbox system as recited in claim 14, further comprising a first main module spur gear and a second main module spur gear mounted to a common spur gear shaft, said first main module spur gear meshingly engaged with said first main gear along an outer periphery thereof relative said rotor axis of rotation and said second main module spur gear meshingly engages with said first main gear about an inner periphery thereof relative to said rotor axis of rotation to provide contra-rotation between said first main gear and said second main gear.

18. The split torque gearbox system as recited in claim 17, wherein said common spur gear shaft rotates about an axis of rotation having a component generally parallel to said rotor axis of rotation.

19. The split torque gearbox system as recited in claim 18, further comprising a spiral bevel gear mounted to said common spur gear shaft, said spiral bevel gear driven by an input shaft which extends from said input module, said input shaft driven by said second spur gear.

20. A split torque gearbox system comprising:

an input module;

a main module in meshing engagement with said input module through an input shaft, said main module including a first main gear and a second main gear for coaxial counter rotation about a rotor axis of rotation, said input shaft rotatable about an input shaft axis of rotation generally transverse to said rotor axis of rotation;

a first main module gear and a second main module gear mounted to a common spur gear shaft which rotates about a shaft axis of rotation generally parallel to said rotor axis of rotation, said first main module gear meshingly engaged with said first main gear along an outer periphery thereof relative said rotor axis of rotation and said second main module gear meshingly engages with said second main gear about an inner periphery thereof relative to said rotor axis of rotation to provide contra-rotation between said first main gear and said second main gear; and a translational thrust module in meshing engagement with said input module, said translational thrust module rotates a transmission shaft about a transmission shaft axis of rotation generally transverse said rotor axis of rotation.

* * * * *